United States Patent
Takahashi et al.

(10) Patent No.: US 9,601,809 B2
(45) Date of Patent: Mar. 21, 2017

(54) LITHIUM SECONDARY BATTERY

(71) Applicant: NEC Corporation, Tokyo (JP)

(72) Inventors: Makiko Takahashi, Tokyo (JP); Takehiro Noguchi, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 14/646,085

(22) PCT Filed: Nov. 20, 2013

(86) PCT No.: PCT/JP2013/081286
§ 371 (c)(1),
(2) Date: May 20, 2015

(87) PCT Pub. No.: WO2014/080945
PCT Pub. Date: May 30, 2014

(65) Prior Publication Data
US 2015/0295277 A1    Oct. 15, 2015

(30) Foreign Application Priority Data
Nov. 21, 2012   (JP) .................................. 2012-255731

(51) Int. Cl.
*H01M 10/052*   (2010.01)
*H01M 10/0569*  (2010.01)
(Continued)

(52) U.S. Cl.
CPC ..... *H01M 10/0569* (2013.01); *H01M 2/0207* (2013.01); *H01M 4/5825* (2013.01); *H01M 4/62* (2013.01); *H01M 10/0525* (2013.01); *H01M 10/0567* (2013.01); *H01M 4/505* (2013.01); *H01M 4/525* (2013.01);
(Continued)

(58) Field of Classification Search
CPC ...................... H01M 10/0569; H01M 10/0567
See application file for complete search history.

(56) References Cited

U.S. PATENT DOCUMENTS

2010/0119956 A1    5/2010  Tokuda et al.
2011/0123871 A1*   5/2011  Nakagawa ........ H01M 10/0525
                                                                    429/326
(Continued)

FOREIGN PATENT DOCUMENTS

JP    6-223874      8/1994
JP    2000-21402    1/2000
(Continued)

OTHER PUBLICATIONS

International Search Report mailed Jan. 21, 2014 in corresponding PCT International application.

*Primary Examiner* — Stewart Fraser
*Assistant Examiner* — Olatunji Godo
(74) *Attorney, Agent, or Firm* — Finnegan, Henderson, Farabow, Garrett & Dunner, L.L.P.

(57) ABSTRACT

A lithium ion secondary battery which is a non-aqueous electrolyte secondary battery comprising a positive electrode comprising a positive electrode active material capable of absorbing and releasing lithium, and an electrolyte solution comprising a non-aqueous electrolyte solvent, wherein the positive electrode comprises a sulfate group, and the non-aqueous electrolyte solvent comprises a sulfone compound represented by a specified formula.

11 Claims, 1 Drawing Sheet

(51) Int. Cl.
     *H01M 4/62*     (2006.01)
     *H01M 10/0567*     (2010.01)
     *H01M 2/02*     (2006.01)
     *H01M 4/58*     (2010.01)
     *H01M 10/0525*     (2010.01)
     *H01M 4/505*     (2010.01)
     *H01M 4/525*     (2010.01)

(52) U.S. Cl.
     CPC .... *H01M 2300/0028* (2013.01); *Y02E 60/122* (2013.01); *Y02P 70/54* (2015.11)

(56) References Cited

U.S. PATENT DOCUMENTS

2013/0280600 A1* 10/2013 Uehara ................. H01M 4/505
     429/200
2015/0140443 A1* 5/2015 Takahashi ............ H01M 4/505
     429/330

FOREIGN PATENT DOCUMENTS

| | | |
|---|---|---|
| JP | 2003-45485 | 2/2003 |
| JP | 2004-14296 | 1/2004 |
| JP | 2005-228653 | 8/2005 |
| JP | 2006-172753 | 6/2006 |
| JP | 3835419 | 10/2006 |
| JP | 2008-269980 | 11/2008 |
| JP | 4235702 | 3/2009 |
| JP | 2009-211822 | 9/2009 |
| JP | 2009-224097 | 10/2009 |
| WO | WO2012127717 * | 9/2012 |

* cited by examiner

LITHIUM SECONDARY BATTERY

CROSS-REFERENCE TO RELATED PATENT APPLICATIONS

This application is a National Stage Entry of International Application No. PCT/JP2013/081286, filed Nov. 20, 2013, which claims priority from Japanese Patent Application Nos. 2012-255731, filed Nov. 21, 2012. The entire contents of the above-referenced applications are expressly incorporated herein by reference.

TECHNICAL FIELD

The present invention relates to a secondary battery, and particularly to a lithium ion secondary battery.

BACKGROUND ART

Lithium ion secondary batteries, which feature small size and large capacity, have been widely used as power supplies for electronic devices such as mobile phones and notebook computers and have contributed to enhancing convenience of mobile IT devices. In recent years, larger-scale applications, such as power supplies for driving motorcycles and automobiles and storage cells for smart grids, have attracted attention.

In addition to a further enhancement in the energy density and the lifetime characteristics for endurance over long-term use, high safety under wide-range temperature conditions is required. Accordingly, materials have been widely contemplated for their electrolyte solution composition and electrode composition, which particularly greatly influences long-term cycles and safety.

As a method to enhance the cycle characteristics, an example of incorporation of a sulfate group in a positive electrode active material is disclosed. For example, Patent Literatures 1 and 2 disclose examples of a positive electrode active material containing a sulfate group in a lithium-transition metal composite oxide having a layered crystalline structure represented by $LiMO_2$ (M is Co or Ni). Patent Literature 3 discloses an example of a lithium-manganese composite oxide having a spinel-type crystalline structure, wherein the composite oxide contains 0.16 to 1% by weight of a sulfate group. Patent Literature 4 discloses a lithium-nickel-manganese composite oxide for a positive electrode material, wherein the composite oxide contains a sulfur component consisting of a sulfate compound. These literatures suggest that the incorporation of the sulfate group in the positive electrode facilitates the passage of electrons around particles and enhances the cycle characteristics and load characteristics. These examples, however, have identified only the positive electrode material and the sulfate group, and have referred to no specific electrolyte solution.

As an electrolyte solution of lithium ion batteries, carbonate-based non-aqueous solvents are generally used. This is because carbonate-based solvents have excellent electrochemical resistance and are low cost. In most cases, a mixed electrolyte solution in which a cyclic carbonate such as ethylene carbonate (EC) and propylene carbonate (PC) is mixed with a chain carbonate such as diethyl carbonate (DEC) and dimethyl carbonate (DMC) is used. Cyclic carbonates have an effect of dissolving/dissociating lithium salts such as $LiPF_6$ because of their high dielectric constant, and chain carbonates have an effect of increasing diffusion of lithium ions in an electrolyte solution because of their low viscosity.

In addition, it is known to use a sulfone compound having $SO_2$ group as a solvent of an electrolyte solution. Sulfone compounds, which have a relatively high dielectric constant, can be used as a solvent having a high dielectric constant instead of the cyclic carbonate. For example, Patent Literature 5 discloses an electrolyte solution containing a lithium salt dissolved in a mixed solvent consisting of 20 to 80% by volume of sulfolane, 10 to 70% by volume of a low-viscosity organic solvent, and 10 to 30% by volume of an organic solvent having a high dielectric constant. Sulfone compounds, which have more excellent oxidation resistance than carbonate solvents, can suppress decomposition of the electrolyte solution under a high voltage as well as can reduce liquid shortage, increases in the internal pressure, and deformation and breakage caused by the increases in the internal pressure or the like.

CITATION LIST

Patent Literature

Patent Literature 1: Japanese Patent No. 4235702
Patent Literature 2: Japanese Patent Laid-Open No. 2004-014296
Patent Literature 3: Japanese Patent No. 3835419
Patent Literature 4: Japanese Patent Laid-Open No. 2006-172753
Patent Literature 5: Japanese Patent Laid-Open No. 6-223874

SUMMARY OF INVENTION

Technical Problem

However, the techniques described in the above Patent Literatures are insufficient in satisfying the cycle charge/discharge characteristics required for recent lithium ion secondary batteries, and further improvements have been required.

In addition, even when a positive electrode active material comprising a sulfate group is used, charge and discharge under high-voltage and high-temperature conditions have a problem of a drop in capacity accompanying a cycle.

An object of the present embodiment is to provide a non-aqueous lithium ion secondary battery in which decomposition of its electrolyte solution is effectively suppressed even under high-voltage and high-temperature conditions and has excellent long-term cycle characteristics.

Solution to Problem

One embodiment according to the present invention is a lithium ion secondary battery comprising a positive electrode comprising a positive electrode active material capable of absorbing and releasing lithium, and an electrolyte solution comprising a non-aqueous electrolyte solvent, wherein
the positive electrode comprises a sulfate group, and
the non-aqueous electrolyte solvent comprises a sulfone compound represented by Formula (1):

(1)

wherein $R_1$ and $R_2$ each independently represent substituted or unsubstituted alkyl group, and a carbon atom of $R_1$ and a carbon atom of $R_2$ may be bonded through a single bond or double bond to form a cyclic structure.

Advantageous Effects of Invention

The present embodiment can improve a problem of a decrease in capacity in cycling under high temperatures and high voltages in a lithium ion secondary battery.

DESCRIPTION OF EMBODIMENTS

A lithium ion secondary battery according to the present embodiment comprises a positive electrode comprising a positive electrode active material capable of absorbing and releasing lithium and an electrolyte solution comprising a non-aqueous electrolyte solvent, wherein the positive electrode comprises a sulfate group, and the electrolyte solution comprises a sulfone compound represented by Formula (1).

[Electrolyte Solution]

An electrolyte solution according to the present embodiment comprises a sulfone compound represented by Formula (1) (hereinbelow, may be simply referred to as "a sulfone compound") as a non-aqueous electrolyte solvent.

(1)

wherein $R_1$ and $R_2$ each independently represent substituted or unsubstituted alkyl group, and a carbon atom of $R_1$ and a carbon atom of $R_2$ may be bonded through a single bond or double bond to form a cyclic structure.

In the sulfone compound represented by Formula (1), the number of carbon atoms $n_1$ of $R_1$, and the number of carbon atoms $n_2$ of $R_2$ are respectively preferably $1 \leq n_1 \leq 12$ and $1 \leq n_2 \leq 12$, more preferably $1 \leq n_1 \leq 6$ and $1 \leq n_2 \leq 6$, and still more preferably $1 \leq n_1 \leq 3$ and $1 \leq n_2 \leq 3$. The alkyl group includes straight-chain, branched-chain, and cyclic ones.

Examples of the substituent in $R_1$ and $R_2$ include alkyl groups having 1 to 6 carbon atoms (for example, methyl group, ethyl group, propyl group, isopropyl group, butyl group, and isobutyl group), aryl groups having 6 to 10 carbon atoms (for example, phenyl group and naphthyl group), and halogen atoms (for example, a chlorine atom, bromine atom, and fluorine atom).

The sulfone compound is preferably a cyclic sulfone compound represented by the following Formula (2):

(2)

wherein $R_3$ represents substituted or unsubstituted alkylene group.

The alkylene group in $R_3$ has preferably 4 to 9 carbon atoms and more preferably 4 to 6 carbon atoms.

Examples of the substituent in $R_3$ include alkyl groups having 1 to 6 carbon atoms (for example, methyl group, ethyl group, propyl group, isopropyl group, and butyl group), and halogen atoms (for example, a chlorine atom, bromine atom, and fluorine atom).

The cyclic sulfone compound is more preferably a compound represented by the following Formula (3):

(3)

wherein m is an integer of 1 to 6.

In Formula (3), m is an integer of 1 to 6 and preferably an integer of 1 to 3.

Examples of the cyclic sulfone compound represented by Formula (1) preferably include tetramethylene sulfone, pentamethylene sulfone, and hexamethylene sulfone. Examples of the cyclic sulfone compound having a substituent preferably include 3-methylsulfolane and 2,4-dimethylsulfolane. These materials, which have excellent oxidation resistance, can suppress decomposition of the electrolyte solution under a high voltage. The materials also have a relatively high dielectric constant, and thus have an advantage of being excellent in dissolving/dissociating lithium salts.

Alternatively, the sulfone compound may be chain sulfone compounds. Examples of the chain sulfone compound include ethyl methyl sulfone, ethyl isopropyl sulfone, ethyl isobutyl sulfone, dimethyl sulfone, and diethyl sulfone. Among these, dimethyl sulfone, ethyl methyl sulfone, ethyl isopropyl sulfone, and ethyl isobutyl sulfone are preferred. These materials, which have excellent oxidation resistance, can suppress decomposition of the electrolyte solution under a high voltage. The materials also have a relatively high dielectric constant, and thus have an advantage of being excellent in dissolving/dissociating lithium salts.

The sulfone compound may be used singly or as a mixture of two or more.

The content of the sulfone compound in the non-aqueous electrolyte solvent is preferably 1% by volume or more and 75% by volume or less, more preferably 5% by volume or more and 50% by volume or less. Containing too small of the sulfone compound may decrease the compatibility of the electrolyte solution, whereas containing too much of the sulfone compound may increase the viscosity of the electrolyte solution and elicit a drop in capacity of the cycle characteristics particularly at room temperature.

In the present embodiment, the non-aqueous electrolyte solvent preferably further comprises a fluorinated ether represented by Formula (4):

(4)

wherein $R_4$ and $R_5$ each independently represent alkyl group or fluorinated alkyl group, and at least one of $R_4$ and $R_5$ is fluorinated alkyl group.

Incorporation of a fluorinated ether allows the viscosity of the electrolyte solution to be reduced and the electrical conductivity of the electrolyte solution to be increased while maintaining the oxidation resistance of the electrolyte solution.

The total number of carbon atoms in $R_4$ and $R_5$ is preferably 10 or less. The alkyl group or fluorinated alkyl group may be linear or branched. The fluorinated alkyl group is preferably fluorinated alkyl group in which 50% or more of, more preferably 60% or more of the hydrogen atoms possessed by the corresponding unsubstituted alkyl group is substituted with a fluorine atom. A large content of the fluorine atoms further increases the voltage resistance to thereby make it possible to reduce deterioration of the battery capacity after cycling more effectively even when a positive electrode active material which operates at a high potential is used.

A preferable example of the fluorinated ether is a compound represented by the following Formula (5):

(5)

wherein n and m are 1 to 8, and $X^4$ to $X^6$ each independently represent a fluorine atom or hydrogen atom, provided that at least one of $X^1$ to $X^3$ and $X^4$ to $X^6$ is a fluorine atom.

In Formula (5), when n is 2 or more, a plurality of $X^2$ and $X^3$ are independent of each other, and when m is 2 or more, a plurality of $X^4$ and $X^5$ are independent of each other.

The fluorinated ether is more preferably a compound represented by the following Formula (6) from the viewpoint of the voltage resistance and the compatibility with other electrolyte.

(6)

wherein n is 1 to 7 and m is 1 to 8, and $X^1$ to $X^6$ each independently represent a fluorine atom or hydrogen atom, provided that at least one of $X^1$ to $X^3$ and $X^4$ to $X^6$ is a fluorine atom.

In Formula (6), when n is 2 or more, a plurality of $X^2$ and $X^3$ are independent of each other, and when m is 2 or more, a plurality of $X^4$ and $X^5$ are independent of each other.

Examples of the fluorinated ether compound include $CF_3OCH_3$, $CF_3OC_2H_5$, $F(CF_2)_2OCH_3$, $F(CF_2)_2OC_2H_5$, $CF_3(CF_2)CH_2O(CF_2)CF_3$, $F(CF_2)_3OCH_3$, $F(CF_2)_3OC_2H_5$, $F(CF_2)_4OCH_3$, $F(CF_2)_4OC_2H_5$, $F(CF_2)_5OCH_3$, $F(CF_2)_5OC_2H_5$, $F(CF_2)_8OCH_3$, $F(CF_2)_8OC_2H_5$, $F(CF_2)_9OCH_3$, $CF_3CH_2OCH_3$, $CF_3CH_2OCHF_2$, $CF_3CF_2CH_2OCH_3$, $CF_3CF_2CH_2OCHF_2$, $CF_3CF_2CH_2O(CF_2)_2H$, $CF_3CF_2CH_2O(CF_2)_2F$, $HCF_2CH_2OCH_3$, $(CF_3)(CF_2)CH_2O(CF_2)_2H$, $H(CF_2)_2OCH_2CH_3$, $H(CF_2)_2OCH_2CF_3$, $H(CF_2)_2CH_2OCHF_2$, $H(CF_2)_2CH_2O(CF_2)_2H$, $H(CF_2)_2CH_2O(CF_2)_3H$, $H(CF_2)_3CH_2O(CF_2)_2H$, $H(CHF)_2CH_2O(CF_2)_2H$, $(CF_3)_2CHOCH_3$, $(CF_3)_2CHCF_2OCH_3$, $CF_3CHFCF_2OCH_3$, $CF_3CHFCF_2OCH_2CH_3$, $CF_3CHFCF_2CH_2OCHF_2$, $CF_3CHFCF_2OCH_2(CF_2)_2F$, $CF_3CHFCF_2OCH_2CF_2CF_2H$, $H(CF_2)_4CH_2O(CF_2)_2H$, $CH_3CH_2O(CF_2)_4F$, $F(CF_2)_4CH_2O(CF_2)_2H$.

The content of fluorinated ether represented by the Formula (4) in the total non-aqueous electrolyte solvent is preferably 10% by volume or more and 90% by volume or less, more preferably 20% by volume or more and 85% by volume or less, more preferably 30% by volume or more and 80% by volume or less, still more preferably 40% by volume or more and 60% by volume or less. Containing too small amount of the fluorinated ether may increase the viscosity of the electrolyte solution to thereby decrease the electrical conductivity and elicit a drop in capacity in the cycles. On the other hand, containing too much amount of fluorinated ether compound may decrease the dielectric constant of the electrolyte solution and thereby the supporting electrolyte becomes impossible to dissociate, and a drop in capacity may be occurred as well.

The fluorinated ether represented by the Formula (4) may be used singly or in combination of two or more.

In the present embodiment, the non-aqueous electrolyte solvent preferably further comprises a carbonate compound, in addition to the sulfone compound, and the fluorinated ether as required. Use of a carbonate compound increases the ion dissociation degree of the electrolyte solution as well as decreases the viscosity of the electrolyte solution. This thus enables the ion mobility to be increased. Examples of the carbonate compound include cyclic carbonates and chain carbonates. Examples of the carbonate compound include ethylene carbonate (EC), propylene carbonate (PC), butylene carbonate (BC), vinylene carbonate (VC), dimethyl carbonate (DMC), diethyl carbonate (DEC), ethyl methyl carbonate (MEC), dipropyl carbonate (DPC). Some or all of the hydrogen atoms in these carbonate compounds may be each substituted with a fluorine atom. These carbonate compounds may be used singly, or in combination of two or more. The content of the carbonate compound in the total solvent is preferably 10 to 50% by volume and more preferably 20 to 40% by volume.

Examples of the non-aqueous electrolyte solvent include, in addition to those described above, γ-lactones such as γ-butyrolactone, chain ethers such as 1,2-ethoxyethane (DEE) and ethoxymethoxyethane (EME), cyclic ethers such as tetrahydrofuran and 2-methyltetrahydrofuran, aprotic organic solvents such as dimethylsulfoxide, 1,3-dioxolane, formamide, acetamide, dimethylformamide, dioxolane, acetonitrile, propylnitrile, nitromethane, ethyl monoglyme, phosphate triester, trimethoxymethane, dioxolane derivatives, 1,3-dimethyl-2-imidazolidinone, 3-methyl-2-oxazolidinone, propylene carbonate derivatives, tetrahydrofuran derivatives, 1,3-propanesultone, anisole, N-methylpyrrolidone, and fluorinated carboxylate esters. These may be used singly or as a mixture of two or more.

Examples of the lithium salt to be dissolved in the electrolyte solution include, but are not particularly limited to, $LiPF_6$, $LiAsF_6$, $LiAlCl_4$, $LiClO_4$, $LiBF_4$, $LiSbF_6$, $LiCF_3SO_3$, $LiC_4F_9CO_3$, $LiC(CF_3SO_2)_3$, $LiN(CF_{3SO2})_2$, $LiN(C_2F_5SO_2)_2$, $LiB_{10}Cl_{10}$, lithium lower aliphatic carboxylate, chloroborane lithium, lithium tetraphenylborate, LiCl, LiBr, LiI, LiSCN, and LiCl. The concentration of the lithium salt in the electrolyte solution is preferably from 0.6 to 1.8 mol/l. A concentration of the lithium salt in such ranges makes it easy to adjust the density, viscosity, electrical conductivity and the like within an appropriate range.

[Positive Electrode]

The secondary battery of the present embodiment comprises a sulfate group in its positive electrode.

In the present embodiment, examples of materials comprising a sulfate group constituting the positive electrode include sulfate ions, groups of atoms formed by removing charges from sulfate ions, alkaline metal sulfates, alkaline earth metal sulfates, transition metal sulfates, organic sulfates, and organic sulfonic acid and salts thereof. Specifically, examples include $Li_2SO_4$, $Na_2SO_4$, $MgSO_4$, $MnSO_4$, $NiSO_4$, $FeSO_4$, $CoSO_4$, and $CuSO_4$.

A method for incorporating a sulfate group in the positive electrode is not particularly limited. A sulfate group may be incorporated in the step of preparing a positive electrode active material, or a sulfate group may be added to a positive electrode active material after preparation, or these methods may be combined.

An example of the method for incorporating a sulfate group in the step of preparing a positive electrode active material includes a method in which a positive electrode active material is synthesized using a reaction raw material comprising a sulfate group. Examples of the reaction raw material comprising a sulfate group include materials such as lithium carbonate which is a lithium source, cobalt oxide which is a cobalt source, nickel oxide which is a nickel source, manganese dioxide which is a manganese source, and oxides of other transition metal elements in which a sulfate group is incorporated.

Examples of the method for adding a sulfate group to the positive electrode active material after preparation include a method in which an inorganic or organic sulfate is added to the positive electrode active material after synthesis, and a method in which an inorganic or organic sulfate is added to a positive electrode mixture when an electrode slurry is prepared from the positive electrode mixture in which a positive electrode active material, a binder, a conductive assistant, and the like are mixed.

In the present embodiment, the weight ratio of the sulfate group is represented by % by weight of the sulfate group relative to the total weight of the positive electrode active material and the sulfate group in the positive electrode. In the case of adding a sulfate group to the positive electrode active material, the weight ratio of the sulfate group can be calculated from the weight of the positive electrode active material and the weight of the sulfate group added.

In the case of incorporating a sulfate group in the positive electrode active material in the step of preparing the positive electrode active material, the weight ratio of the sulfate group is represented by (Weight of the sulfate group quantified by analysis)/(Weight of the sulfate group-containing positive electrode active material obtained by synthesis). The weight of the sulfate group herein can be quantified using various methods. For example, after a sample is completely dissolved with nitric acid—hydrogen peroxide and the like, the sulfate group can be quantified by ion chromatography. Alternatively, the sulfate group can be quantified by ICP emission spectrometry or a titration method. The ICP emission spectrometry is a method of quantifying sulfur by ICP emission spectrometry by dissolving a sample by nitric acid and perchloric acid, and converting it into an amount of sulfate group. The titration method is a method of indirectly quantifying sulfate group by adding barium chromate and a dilute hydrochloric acid solution to a sample, filtering the sample after neutralization with ammonia, and titrating $CrO_4^{2-}$ formed from substitution with sulfate group in the filtrate by iodometry.

The % by weight of the sulfate group relative to the total weight of the positive electrode active material and the sulfate group in the positive electrode is preferably 0.01% by weight or more and 5% by weight or less, more preferably 0.08% by weight or more and 1.5% by weight or less, and still more preferably 0.1% by weight or more and 1.5% by weight or less. A too small amount of the sulfate group may deteriorate the high-temperature cycle characteristics of the secondary battery. In contrast, a too large amount of the sulfate group may reduce the amount of the active material effective for the battery reaction in the positive electrode, and thus, may lead to reduction in the battery capacity. A too large amount of the sulfate group also may degrade the electrical conductivity, and thus, may lead to degradation in the rate characteristics.

In the present embodiment, the positive electrode active material is not particularly limited as long as it can intercalate lithium ions in charging and deintercalate them in discharging, and, for example, those known can be used.

Examples of the positive electrode active material include lithium manganate having a layer structure or lithium manganate having a spinel structure such as $LiMnO_2$ and $Li_xMn_2O_4$ ($0<x<2$); $LiCoO_2$, $LiNiO_2$, and materials in which a part of the transition metal thereof is substituted with another metal; lithium transition metal oxides in which the ratio of a specific transition metal is not more than one half such as $LiNi_{1/3}Co_{1/3}Mn_{1/3}O_2$; materials having an olivine structure such as $LiFePO4$; and materials which have lithium at a larger amount than the stoichiometric composition in these lithium transition metal oxides. Particularly, $Li_\alpha Ni_\beta Co_\gamma Al_\delta O_2$ ($1\leq\alpha\leq1.2$, $\beta+\gamma+\delta=1$, $\beta\geq0.7$, $\gamma\leq0.2$) or $Li_\alpha Ni_\beta Co_\gamma Mn_\delta O_2$ ($1\leq\alpha\leq1.2$, $\beta+\gamma+\delta=1$, $\beta\geq0.6$, $\gamma\leq0.2$) is preferable. These materials may be used singly or in combination of two or more.

In the present embodiment, as the positive electrode active material, lithium-containing composite oxides capable of absorbing and releasing lithium at 4.5 V or more at a metal lithium counter electrode potential are preferable, and lithium-containing composite oxides having a plateau at 4.5 V or more at a metal lithium counter electrode potential are more preferably used. The effect of the present embodiment can be more exerted by the effect of suppressing decomposition of the electrolyte solution under a high voltage.

As the positive electrode active material which operates at a potential of 4.5 V or more versus metal lithium, a lithium-manganese composite oxide represented by the following Formula (8) can be used, for example:

$$Li_a(M_xMn_{2-x-y}Y_y)(O_{4-w}Z_w) \tag{8}$$

wherein $0.4\leq x\leq1.2$, $0\leq y$, $x+y<2$, $0\leq a\leq1.2$, $0\leq w\leq1$, M is at least one selected from the group consisting of Co, Ni, Fe, Cr, and Cu, Y is at least one selected from the group consisting of Li, B, Na, Mg, Al, Ti, Si, K, and Ca, and Z is at least one of F and Cl. Specific examples preferably include $LiNi_{0.5}Mn_{1.5}O_4$, $LiCrMnO_4$, $LiFeMnO_4$, $LiCoMnO_4$, $LiCuo0.5Mn_{1.5}O_4$ and the like. These positive electrode active materials have a high capacity.

The positive electrode active material which operates at a potential of 4.5 V or more versus metal lithium is preferably a lithium manganese composite oxide represented by the following Formula (8-1) from the viewpoint of obtaining sufficient capacity and extending the life time:

$$LiNi_xMn_{2-x-y}A_yO_4 \tag{8-1}$$

wherein $0.4<x<0.6$, $0\leq y<0.3$, and A is at least one selected from Li, B, Na, Mg, Al, Ti, and Si.

An example of the olivine-type positive electrode active material which operates at a potential of 4.5 V or more includes:

$$LiMPO_4 \tag{9}$$

wherein M is at least one of Co and Ni, and $LiCoPO_4$, $LiNiPO_4$ or the like is preferable.

An example of the positive electrode active material which operates at a potential of 4.5 V or more versus metal lithium also includes Si composite oxides, and examples of the Si composite oxide include $Li_2MSiO_4$ (M: at least one of Mn, Fe and Co).

Examples of the positive electrode active material which operates at a potential of 4.5 V or more versus metal lithium also include those having a layer structure. Examples of the positive electrode active material having layer structure include:

$$Li(Li_xM_{1-x-z}Mn_z)O_2 \tag{10}$$

wherein $0\leq x<0.3$ and $0.3\leq z\leq0.7$, and M is at least one selected from Co, Ni, and Fe.

A positive electrode can be formed by, for example, mixing a positive electrode active material, an electric conductivity imparting agent, and a positive electrode binder to prepare a positive electrode slurry and arranging the slurry on a current collector.

Examples of the electric conductivity imparting agent include carbon materials such as acetylene black, carbon black, fibrous carbon, and graphite as well as metal material such as Al, and electrical conductive oxide powder.

Examples of the positive electrode binder which can be used include, but are not particularly limited to, polyvinylidene fluoride (PVdF), vinylidene fluoride-hexafluoropropylene copolymers, vinylidene fluoride-tetrafluoroethylene copolymer, styrene-butadiene copolymerized rubber, polytetrafluoroethylene, polypropylene, polyethylene, polyimide, and polyamide-imide.

The content of the electric conductivity imparting agent in the positive electrode slurry can be, for example, from 1 to 10% by mass. The content of the binder in the positive electrode slurry can be, for example, from 1 to 10% by mass. Within such ranges, it is easy to secure a sufficient proportion of the active material in the electrode and to obtain sufficient capacity per unit mass.

Examples of the positive electrode current collector preferably include, but are not particularly limited to, aluminum, nickel, copper, silver, and alloys thereof from the viewpoint of electrochemical stability. Examples of the shape include foil, plate, and mesh shapes.

[Negative Electrode]

The negative electrode active materials are not particularly limited as long as they can absorb and release lithium ions, and those known can be used. Specific examples of the negative electrode active material include carbon materials such as graphite, coke, and hard carbon, lithium alloys such as lithium-aluminum alloys, lithium-lead alloys, and lithium-tin alloys, lithium metal, Si, and metal oxides having a potential less noble than that of the positive electrode active material, such as $SnO_2$, SnO, $TiO_2$, $Nb_2O_3$, and SiO.

A negative electrode can be formed by, for example, mixing a negative electrode active material, an electric conductivity imparting agent, and a negative electrode binder to prepare a negative electrode slurry and arranging the slurry on a negative electrode current collector.

Examples of the electric conductivity imparting agent include carbon materials and electrical conductive oxide powder.

Examples of the negative electrode binder which can be used include, but are not particularly limited to, polyvinylidene fluoride, vinylidene fluoride-hexafluoropropylene copolymers, vinylidene fluoride-tetrafluoroethylene copolymer, styrene-butadiene copolymerized rubber, polytetrafluoroethylene, polypropylene, polyethylene, polyimide, polyamide-imide, and polyacrylic acid. Among these, polyimide or polyamide imide is preferred because of the strong binding properties. The amount of the negative electrode binder to be used is preferably from 5 to 25 parts by mass based on 100 parts by mass of the negative electrode active material from the viewpoint of a trade-off relationship between "a sufficient binding power" and "an increase in energy".

The negative electrode collector is not particularly limited, and aluminum, nickel, stainless, chromium, copper, silver, and alloys thereof are preferred from the viewpoint of the electrochemical stability. Examples of the shape include foil, plate, and mesh shapes.

Examples of the method for forming a negative electrode active material layer include doctor blade methods, die coater methods, CVD methods, and sputtering methods. A thin film of aluminum, nickel, or alloys thereof may be formed by a method such as vapor deposition and sputtering to provide a negative electrode after a negative electrode active material layer is formed in advance.

[Separator]

The separator is not particularly limited, and those known can be used. Examples of the separator that can be used specifically include polyolefin-based microporous films such as polyethylene and polypropylene, and those comprising cellulose and glass fiber.

[Outer Package]

The outer package may be appropriately selected as long as it is stable to the electrolyte solution and has sufficient water vapor barrier properties. For example, in the case of a layered laminate-type secondary battery, examples of the outer package that can be used include laminate films, such as polypropylene and polyethylene on which aluminum or silica is coated. Particularly, from the viewpoint of suppressing volume expansion, aluminum laminate films are preferably used.

[Secondary Battery]

The secondary battery can have a configuration in which a positive electrode having a positive electrode active material, a negative electrode having a negative electrode active material, a separator interposed between the positive electrode and the negative electrode as an insulator, and a electrolyte solution having lithium-ion conductivity are sealed within an outer package. By applying an electric voltage across the positive electrode and negative electrode, the positive electrode active material releases lithium ions and the negative electrode active material absorbs the lithium ions, and thus, the battery becomes a charged state. In a discharged state, the battery becomes a state opposite to the charged state.

Examples of the shape of the battery include cylindrical, rectangular, coin, button, and laminate shapes. Examples of the battery outer package include stainless, iron, aluminum, titanium, or alloys thereof, or plated products thereof. An example of the plating that can be used includes nickel plating.

The secondary battery can be produced, for example, by housing a layered body of a negative electrode and a positive electrode with a separator interposed inbetween, or the one obtained by winding the layered body in an outer package such as a can case under a dried air or inert gas atmosphere, and then pouring an electrolyte solution into the outer package, and then sealing it with a flexible film or the like made of a laminate of synthetic resin and metal foils or the like.

The configuration of the secondary battery is not particularly limited, for example, the battery can be a configuration of a winding type in which a positive electrode and a negative electrode which are disposed on opposite sides of a separator are wound, or a lamination type in which the same are laminated.

Figure 1:
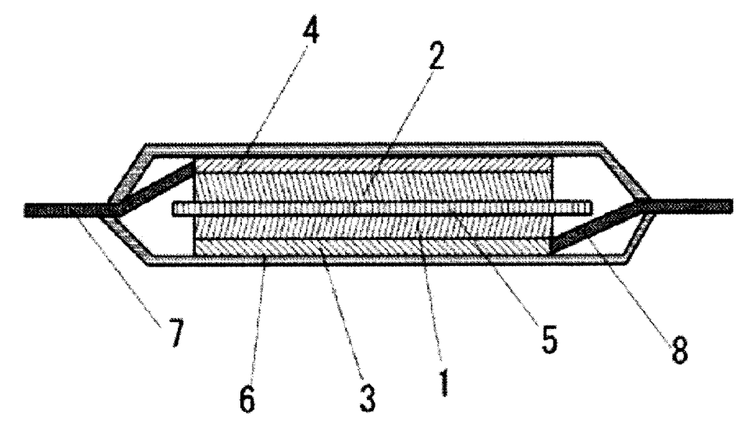
FIG. 1 is a cross-sectional view showing an example of a lithium ion secondary battery of the present invention.

FIG. 1 shows a laminate-type secondary battery as an example of the secondary battery. A separator 5 is interposed between a positive electrode which is composed of a positive electrode active material layer 1 comprising a positive electrode active material and a positive electrode current collector 3, and a negative electrode which is composed of a negative electrode active material layer 2 and a negative electrode current collector 4. The positive electrode current collector 3 is connected with a positive electrode lead terminal 8, and the negative electrode current collector 4 is connected with a negative electrode lead terminal 7. An outer package laminate 6 is used for the outer package, and the inside of the secondary battery is filled with a electrolyte solution.

Examples of the laminate resin film used in laminate types include aluminum, aluminum alloy, and titanium foil. Examples of the material for the heat-welding portions of the metal laminate resin film include thermoplastic polymer materials such as polyethylene, polypropylene, and polyethylene terephthalate. Each metal laminate resin layer and metal foil layer is not limited to one layer, and they may be two or more layers.

EXAMPLES

Hereinbelow, examples of the present embodiment will be described in details, but the present embodiment is not intended to be limited to the following examples.

Abbreviations used in the following Examples will be described.
SL: sulfolane
EC: ethylene carbonate
PC: propylene carbonate
FE1: $H(CF_2)_2CH_2O(CF_2)_2H$
FE2: $CF_3CHFCF_2OCH_2(CF_2)_2H$
(1H,1H,2'H,3H-Decafluorodipropylether)
DMS: dimethyl sulfone
EMS: ethyl methyl sulfone
DMC: dimethyl carbonate

Example 1

(Production of a Positive Electrode)

Powders of electrolytic manganese dioxide (EMD) having a concentration of the sulfate group of 2.3% by weight, NiO, $Li_2CO_3$, and $Ti_3O_3$ used as raw materials were weighed so as to be the intended composition ratio, and were pulverized and mixed. Subsequently, the mixed powder was calcined at 750° C. for 8 hours to produce $LiNi_{0.5}Mn_{1.37}Ti_{0.13}O_4$. This positive electrode active material was confirmed to have a substantially single-phase, spinel structure. The concentration of the sulfate group in the prepared positive electrode active material (including the sulfate group) quantified by ICP emission spectrometry was 1.03% by weight.

The prepared positive electrode active material and a carbon black which is an electric conductivity imparting agent were mixed, and the mixture was dispersed in a solution in which polyvinylidene fluoride (PVDF) as a binder was dissolved in N-methylpyrrolidone and serves to prepare a positive electrode slurry. The mass ratio of the positive electrode active material, the electric conductivity imparting agent, and the positive electrode binder was 91/5/4. The positive electrode slurry was uniformly applied on the both sides of a current collector composed of Al. Subsequently, the resultant was dried in vacuum for 12 hours and was subjected to a compression-molding by a roll press to produce a positive electrode.

(Production of a Negative Electrode)

Graphite as a negative electrode active material was dispersed in a solution in which polyvinylidene fluoride (PVDF) as a negative electrode binder was dissolved in N-methylpyrrolidone to prepare a negative electrode slurry. The mass ratio of the negative electrode active material and the negative electrode binder was 90/10. The slurry was uniformly applied on the both sides of a Cu current collector. Subsequently, the resultant was dried in vacuum for 12 hours and was subjected to a compression-molding by a roll press to produce a negative electrode.

(Electrolyte Solution)

Sulfolane (SL), ethylene carbonate (EC), and a fluorinated ether (FE1) represented by $H(CF_2)_2CH_2O(CF_2)_2H$ were mixed so as to achieve 2:3:5 (volume ratio) to prepare a solvent. $LiPF_6$ was added so as to be 1 M to this solvent to thereby prepare an electrolyte solution.

(Production of a Laminate-Type Battery)

The above-described positive electrode and the negative electrode were cut into 1.5 cm×3 cm. The five positive electrode layers and six negative electrode layers obtained were alternately laminated with polypropylene porous films interposed inbetween as a separator. The ends of the positive electrode current collector not covered with the positive electrode active material and the ends of the negative electrode current collector not covered with the negative electrode active material were each welded, and a positive electrode terminal made of aluminum and a negative electrode terminal made of nickel were welded to the welded parts to thereby obtain an electrode element having a flat laminate structure. The electrode element described above was enclosed with an aluminum laminate film that serves as an outer package, then the internal of outer package was poured with the electrolyte solution, and then the outer package was sealed under reduced pressure to produce a secondary battery.

Examples 2 to 9 and Comparative Examples 11 and 13

Batteries were produced as in Example 1 except that the solvent was of the composition shown in Table 1. The composition ratio of the mixed solvent in Table 1 (a/b/c/d) is a volume ratio.

Comparative Examples 1 to 10 and 12

Powders of $MnO_2$ having a concentration of the sulfate group of 0.0% by weight, NiO, $Li_2CO_3$, and $Ti_3O_3$ used as raw materials were weighed so as to be the intended composition ratio, and were pulverized and mixed. Subsequently, the mixed powder was calcined at 750° C. for 8 hours to produce $LiNi_{0.5}Mn_{1.37}Ti_{0.13}O_4$. This positive electrode active material was confirmed to have a substantially single-phase, spinel structure. The concentration of the sulfate group in the prepared positive electrode active material quantified by ICP emission spectrometry was 0.0% by weight. Batteries were produced as in Example 1 except that this positive electrode active material was used, and the solvent was of the composition shown in Table 1.

(High Temperature Cycle Test)

High temperature cycle characteristics were evaluated on the batteries produced as described above. A cycle including charging a battery at 1 C to 4.8 V and carrying out constant voltage charge for a total of 2.5 hours and then carrying out constant current discharge at 1 C to 3.0 V was repeated 300 times at 45° C. The proportion of the discharge capacity after 300 cycles to the initial discharge capacity was determined as the capacity retention ratio.

The capacity retention ratios after 300 cycles at 45° C. of the secondary batteries produced in Examples 1 to 9 and Comparative Examples 1 to 13 are shown in Table 1. Examples 1 to 9 and Comparative Examples 1 to 9 are batteries in which an electrolyte solution containing a sulfone compound was used. In this case, it was found that incorporation of the sulfate group in the positive electrode greatly improved the capacity retention ratio in cycles at a high temperature of 45° C. compared with the case where no sulfate group was contained. In contrast, in Comparative Examples 10 to 13, which show the capacity retention ratios of the batteries in which an electrolyte solution containing no sulfone compound is used, incorporation of the sulfate group improved the capacity retention only slightly, in comparison between the case where the positive electrode contains a sulfate group and the case where the positive electrode contains no sulfate group.

TABLE 1

| | Mixed solvent | | Content of sulfate group | Retention ratio at |
| --- | --- | --- | --- | --- |
| | Composition | Volume ratio | (% by weight) | 45° C. 300 cycles (%) |
| Com-Ex. 1 | SL/EC/FE1 | 2/3/5 | 0.00 | 64 |
| Ex. 1 | SL/EC/FE1 | 2/3/5 | 1.03 | 83 |
| Com-Ex. 2 | SL/EC/FE1 | 4/1/5 | 0.00 | 62 |
| Ex. 2 | SL/EC/FE1 | 4/1/5 | 1.03 | 82 |
| Com-Ex. 3 | SL/EC/FE1 | 1/2/7 | 0.00 | 61 |
| Ex. 3 | SL/EC/FE1 | 1/2/7 | 1.03 | 81 |
| Com-Ex. 4 | SL/EC/PC/FE1 | 4/1/0.5/4.5 | 0.00 | 61 |
| Ex. 4 | SL/EC/PC/FE1 | 4/1/0.5/4.5 | 1.03 | 79 |
| Com-Ex. 5 | EC/SL/FE2 | 2/3/5 | 0.00 | 62 |
| Ex. 5 | EC/SL/FE2 | 2/3/5 | 1.03 | 80 |
| Com-Ex. 6 | DMS/EC/FE1 | 2/3/5 | 0.00 | 67 |
| Ex. 6 | DMS/EC/FE1 | 2/3/5 | 1.03 | 85 |
| Com-Ex. 7 | EMS/EC/FE1 | 2/3/5 | 0.00 | 66 |
| Ex. 7 | EMS/EC/FE1 | 2/3/5 | 1.03 | 84 |
| Com-Ex. 8 | SL/DMS/EC/FE1 | 1/1/3/5 | 0.00 | 65 |
| Ex. 8 | SL/DMS/EC/FE1 | 1/1/3/5 | 1.03 | 81 |
| Com-Ex. 9 | SL/EC/DMC | 2/2/6 | 0.00 | 61 |
| Ex. 9 | SL/EC/DMC | 2/2/6 | 1.03 | 75 |
| Com-Ex. 10 | EC/DMC | 4/6 | 0.00 | 58 |
| Com-Ex. 11 | EC/DMC | 4/6 | 1.03 | 59 |
| Com-Ex. 12 | EC/DMC/FE1 | 3/2/5 | 0.00 | 62 |
| Com-Ex. 13 | EC/DMC/FE1 | 3/2/5 | 1.03 | 64 |

In the table, the content of sulfate group indicates % by weight of the sulfate group determined by ICP emission analysis relative to the total weight of the positive electrode active material and the sulfate group in the positive electrode.
Com-Ex: Comparative Example,
Ex: Example Examples 10 to 231

Batteries were produced as in Example 1 except that in the positive electrode active material produced in Comparative Example 1, sulfate was mixed into the active material respectively as shown in Table 2, and then a positive electrode slurry was prepared. Types of the sulfate added and the contents of the sulfate group are shown in Table 2. The content of the sulfate group herein is represented by % by weight of the sulfate group relative to the total weight of the weight of the positive electrode active material before addition of the sulfate and the weight of the sulfate group. The results of the cycle evaluation carried out at 45° C. as in Example 1 are shown in Table 2.

It was found that excellent cycle characteristics were shown by use of an electrolyte solution containing a sulfone compound even in the cases where a sulfate was added after synthesis of the active material as in Examples 10 to 23. According to Examples 10 to 16, it was found that particularly excellent cycle characteristics were shown when the content of the sulfate group was 0.1% by weight to 1.5% by weight. According to Examples 17 to 23, it was found that excellent cycle characteristics were shown by use of an electrolyte solution containing a sulfone compound even in the cases where the type of the sulfate added was changed.

TABLE 2

| | Sulfate added | Content of sulfate group (% by weight) | Mixed solvent composition | | Retention ratio at 45° C. 300 cycles (%) |
| --- | --- | --- | --- | --- | --- |
| Com-Ex. 1 | — | 0.00 | SL/EC/FE1 | 2/3/5 | 64 |
| Ex. 10 | $Li_2SO_4$ | 0.05 | SL/EC/FE1 | 2/3/5 | 69 |
| Ex. 11 | $Li_2SO_4$ | 0.10 | SL/EC/FE1 | 2/3/5 | 77 |
| Ex. 12 | $Li_2SO_4$ | 0.50 | SL/EC/FE1 | 2/3/5 | 79 |
| Ex. 13 | $Li_2SO_4$ | 0.79 | SL/EC/FE1 | 2/3/5 | 80 |
| Ex. 14 | $Li_2SO_4$ | 0.99 | SL/EC/FE1 | 2/3/5 | 81 |
| Ex. 15 | $Li_2SO_4$ | 1.48 | SL/EC/FE1 | 2/3/5 | 78 |
| Ex. 16 | $Li_2SO_4$ | 2.91 | SL/EC/FE1 | 2/3/5 | 72 |
| Ex. 17 | $Na_2SO_4$ | 0.99 | SL/EC/FE1 | 2/3/5 | 79 |
| Ex. 18 | $MgSO_4$ | 0.99 | SL/EC/FE1 | 2/3/5 | 78 |
| Ex. 19 | $MnSO_4$ | 0.99 | SL/EC/FE1 | 2/3/5 | 76 |
| Ex. 20 | $NiSO_4$ | 0.99 | SL/EC/FE1 | 2/3/5 | 75 |
| Ex. 21 | $FeSO_4$ | 0.99 | SL/EC/FE1 | 2/3/5 | 77 |
| Ex. 22 | $CoSO_4$ | 0.99 | SL/EC/FE1 | 2/3/5 | 74 |
| Ex. 23 | $CuSO_4$ | 0.99 | SL/EC/FE1 | 2/3/5 | 73 |

In the table, the content of sulfate group indicates % by weight of the sulfate group relative to the total weight of the positive electrode active material and the sulfate group in the positive electrode.
Com-Ex: Comparative Example,
Ex: Example Comparative Examples 14 to 24

Batteries were produced as in Example 1 except that each positive electrode active material shown in Table 3 was produced using raw materials containing no sulfate group and this positive electrode active material was used. High-temperature cycle test on the secondary batteries produced in Comparative Examples 14 to 20 was performed as in Example 1. High-temperature cycle test on the secondary batteries produced in Comparative Examples 21 to 24 was performed as in Example 1 except that charging was performed at 1 C to 4.2 V.

Examples 24 to 34

Batteries were produced as in Example 1 except that $Li_2SO_4$ was mixed into each positive electrode active material produced in Comparative Examples 14 to 24 to achieve a content of the sulfate group of 0.99% by weight relative to the total weight of the positive electrode active material and the sulfate group, and then a positive electrode slurry was prepared. High-temperature cycle test on the secondary batteries produced in Examples 24 to 30 was performed as in Example 1. High-temperature cycle test on the secondary batteries produced in Examples 31 to 34 was performed as in Example 1 except that charging was performed at 1 C to 4.2 V.

As shown in Table 3, excellent high-temperature cycle characteristics were achieved by use of the positive electrode active material containing sulfate group and the electrolyte solution containing a sulfone compound even when the type of the positive electrode active material was changed. The improvement was large in particular when positive electrode active materials each having a charge/discharge region of 4.5 V or more versus metal lithium shown in Example 1 and Examples 24 to 30 were used. A larger improving effect was achieved by use of, in particular, the positive electrode active materials having a spinel structure as shown in Example 1 and Examples 24 to 28. Active materials having a charge/discharge region of less than 4.5 V versus metal lithium in Examples 31 to 34 also achieved an effect of improving the capacity retention ratio. Also in this case, the active materials having a spinel structure achieved a larger improvement than other active materials.

TABLE 3

| | Positive electrode active material | Mixed solvent Composition | | Content of sulfate group (% by weight) | Retention ratio at 45° C. 300 cycles (%) |
|---|---|---|---|---|---|
| Com-Ex. 1 | $LiNi_{0.5}Mn_{1.37}Ti_{0.13}O_4$ | SL/EC/FE1 | 2/3/5 | 0.0 | 64 |
| Ex. 1 | $LiNi_{0.5}Mn_{1.37}Ti_{0.13}O_4$ | SL/EC/FE1 | 2/3/5 | 0.99 | 83 |
| Com-Ex. 14 | $LiNi_{0.5}Mn_{1.45}Si_{0.05}O_4$ | SL/EC/FE1 | 2/3/5 | 0.0 | 63 |
| Ex. 24 | $LiNi_{0.5}Mn_{1.45}Si_{0.05}O_4$ | SL/EC/FE1 | 2/3/5 | 0.99 | 80 |
| Com-Ex. 15 | $LiNi_{0.5}Mn_{1.45}Li_{0.05}O_4$ | SL/EC/FE1 | 2/3/5 | 0.0 | 62 |
| Ex. 25 | $LiNi_{0.5}Mn_{1.45}Li_{0.05}O_4$ | SL/EC/FE1 | 2/3/5 | 0.99 | 78 |
| Com-Ex. 16 | $LiNi_{0.5}Mn_{1.45}Al_{0.05}O_{3.95}F_{0.05}$ | SL/EC/FE1 | 2/3/5 | 0.0 | 64 |
| Ex. 26 | $LiNi_{0.5}Mn_{1.45}Al_{0.05}O_{3.95}F_{0.05}$ | SL/EC/FE1 | 2/3/5 | 0.99 | 79 |
| Com-Ex. 17 | $LiNi_{0.5}Mn_{1.5}O_4$ | SL/EC/FE1 | 2/3/5 | 0.0 | 59 |
| Ex. 27 | $LiNi_{0.5}Mn_{1.5}O_4$ | SL/EC/FE1 | 2/3/5 | 0.99 | 73 |
| Com-Ex. 18 | $LiNi_{0.25}Fe_{0.25}Mn_{1.5}O_4$ | SL/EC/FE1 | 2/3/5 | 0.0 | 50 |
| Ex. 28 | $LiNi_{0.25}Fe_{0.25}Mn_{1.5}O_4$ | SL/EC/FE1 | 2/3/5 | 0.99 | 63 |
| Com-Ex. 19 | $LiCoPO_4$ | SL/EC/FE1 | 2/3/5 | 0.0 | 50 |
| Ex. 29 | $LiCoPO_4$ | SL/EC/FE1 | 2/3/5 | 0.99 | 61 |
| Com-Ex. 20 | $Li(Li_{0.15}Ni_{0.2}Mn_{0.65})O_2$ | SL/EC/FE1 | 2/3/5 | 0.0 | 49 |
| Ex. 30 | $Li(Li_{0.15}Ni_{0.2}Mn_{0.65})O_2$ | SL/EC/FE1 | 2/3/5 | 0.99 | 58 |
| Com-Ex. 21 | $LiMn_{1.9}Al_{0.1}O_4$ | SL/EC/FE1 | 2/3/5 | 0.0 | 69 |
| Ex. 31 | $LiMn_{1.9}Al_{0.1}O_4$ | SL/EC/FE1 | 2/3/5 | 0.99 | 80 |
| Com-Ex. 22 | $LiCoO_2$ | SL/EC/FE1 | 2/3/5 | 0.0 | 71 |
| Ex. 32 | $LiCoO_2$ | SL/EC/FE1 | 2/3/5 | 0.99 | 77 |
| Com-Ex. 23 | $LiNi_{0.85}Al_{0.1}Co_{0.05}O_2$ | SL/EC/FE1 | 2/3/5 | 0.0 | 70 |
| Ex. 33 | $LiNi_{0.85}Al_{0.1}Co_{0.05}O_2$ | SL/EC/FE1 | 2/3/5 | 0.99 | 76 |
| Com-Ex. 24 | $LiNi_{1/3}Co_{1/3}Mn_{1/3}O_2$ | SL/EC/FE1 | 2/3/5 | 0.0 | 72 |
| Ex. 34 | $LiNi_{1/3}Co_{1/3}Mn_{1/3}O_2$ | SL/EC/FE1 | 2/3/5 | 0.99 | 79 |

In the table, the content of sulfate group indicates % by weight of the sulfate group relative to the total weight of the positive electrode active material and the sulfate group in the positive electrode.
Com-Ex: Comparative Example,
Ex: Example

As described above, the structure of the present embodiment can provide a lithium ion battery having improved lifetime characteristics at high temperatures.

EXPLANATION OF SYMBOLS

1: positive electrode active material layer
2: negative electrode active material layer
3: positive electrode current collector
4: negative electrode current collector
5: separator
6: laminate outer package
7: negative electrode lead terminal
8: positive electrode lead terminal

The invention claimed is:

1. A lithium ion secondary battery comprising a positive electrode comprising a positive electrode active material capable of absorbing and releasing lithium, and an electrolyte solution comprising a non-aqueous electrolyte solvent, wherein
the positive electrode comprises 0.08 to 1.5% by weight of a sulfate group relative to the total weight of the positive electrode active material and the sulfate group, and
the non-aqueous electrolyte solvent comprises a sulfone compound represented by Formula (1):

(1)

wherein $R_1$ and $R_2$ each independently represent substituted or unsubstituted alkyl group, and a carbon atom of $R_1$ and a carbon atom of $R_2$ may be bonded through a single bond or double bond to form a cyclic structure.

2. The lithium ion secondary battery according to claim 1, wherein the positive electrode active material has a charge/discharge region of 4.5 V or more versus lithium.

3. The lithium ion secondary battery according to claim 1, wherein the positive electrode active material is a lithium-transition metal composite oxide having a spinel structure.

4. The lithium ion secondary battery according to claim 1, wherein the sulfone compound is at least one selected from sulfolane, dimethyl sulfone, and ethyl methyl sulfone.

5. The lithium ion secondary battery according to claim 1, wherein the non-aqueous electrolyte solvent further comprises a fluorinated ether represented by Formula (4):

$$R_5\text{—}O\text{—}R_4 \qquad (4)$$

wherein $R_4$ and $R_5$ each independently represent alkyl group or fluorinated alkyl group, and at least one of $R_4$ and $R_5$ is fluorinated alkyl group.

6. A method for producing secondary battery comprising an electrode element, an electrolyte solution, and an outer package, comprising:
a step of preparing a positive electrode comprising a positive electrode active material capable of absorbing and releasing lithium and comprising 0.08 to 1.5% by weight of a sulfate group relative to the total weight of the positive electrode active material and the sulfate group;
a step of preparing an electrode element by arranging the positive electrode and a negative electrode to face each other; and
a step of encapsulating, into an outer package, the electrode element and the electrolyte solution which comprises a non-aqueous electrolyte solvent comprising a sulfone compound represented by Formula (1):

(1)

wherein $R_1$ and $R_2$ each independently represent substituted or unsubstituted alkyl group, and a carbon atom of $R_1$ and a carbon atom of $R_2$ may be bonded through a single bond or double bond to form a cyclic structure.

7. The method for producing a lithium ion secondary battery according to claim 6, wherein the step of preparing the positive electrode comprises a step of synthesizing the positive electrode active material by using a reaction material comprising a sulfate group.

8. The method for producing a lithium ion secondary battery according to claim 6, wherein the step of preparing the positive electrode comprises a step of adding a sulfate to the positive electrode active material.

9. The lithium ion secondary battery according to claim 2, wherein the positive electrode active material comprises at least one selected from the group consisting of positive electrode active materials represented by the following formulas:

$$Li_a(M_xMn_{2-x-y}Y_y)(O_{4-w}Z_w) \tag{8}$$

wherein $0.4 \leq x \leq 1.2$, $0 \leq y$, $x+y<2$, $0 \leq a \leq 1.2$, $0 \leq w \leq 1$, M is at least one selected from the group consisting of Co, Ni, Fe, Cr, and Cu, Y is at least one selected from the group consisting of Li, B, Na, Mg, Al, Ti, Si, K, and Ca, and Z is at least one of F and Cl;

$$LiMPO_4 \tag{9}$$

wherein M is at least one of Co and Ni;

$$Li_2MSiO_4$$

wherein M is at least one of Mn, Fe and Co; and $$Li(Li_xM_{1-x-z}Mn_z)O_2 \tag{10}$$

wherein $0 \leq x < 0.3$ and $0.3 \leq z \leq 0.7$, and M is at least one selected from Co, Ni, and Fe.

10. The lithium ion secondary battery according to claim 2, wherein the positive electrode active material comprises a positive electrode active material represented by the following formula (8):

$$Li_a(M_xMn_{2-x-y}Y_y)(O_{4-w}Z_w) \tag{8}$$

wherein $0.4 \leq x \leq 1.2$, $0 \leq y$, $x+y<2$, $0 \leq a \leq 1.2$, $0 \leq w \leq 1$, M is at least one selected from the group consisting of Co, Ni, Fe, Cr, and Cu, Y is at least one selected from the group consisting of Li, B, Na, Mg, Al, Ti, Si, K, and Ca, and Z is at least one of F and Cl.

11. The lithium ion secondary battery according to claim 2, wherein the positive electrode active material comprises a positive electrode active material represented by the following formula (8-1):

$$LiNi_xMn_{2-x-y}A_yO_4 \tag{8-1}$$

wherein $0.4 < x < 0.6$, $0 \leq y < 0.3$, and A is at least one selected from Li, B, Na, Mg, Al, Ti, and Si.

* * * * *